United States Patent
Saha et al.

(10) Patent No.: US 8,603,223 B2
(45) Date of Patent: Dec. 10, 2013

(54) DESALINATION SYSTEM AND METHOD

(75) Inventors: Bidyut Baran Saha, Singapore (SG);
Kim Choon Ng, Singapore (SG);
Anutosh Chakraborty, Singapore (SG);
Kyaw Thu, Singapore (SG)

(73) Assignee: National University of Singapore, Singapore (SG)

( * ) Notice: Subject to any disclaimer, the term of this patent is extended or adjusted under 35 U.S.C. 154(b) by 143 days.

(21) Appl. No.: 13/384,641

(22) PCT Filed: Jul. 20, 2010

(86) PCT No.: PCT/IB2010/001757
§ 371 (c)(1),
(2), (4) Date: Jan. 18, 2012

(87) PCT Pub. No.: WO2011/010205
PCT Pub. Date: Jan. 27, 2011

(65) Prior Publication Data
US 2012/0119396 A1 May 17, 2012

Related U.S. Application Data

(60) Provisional application No. 61/226,783, filed on Jul. 20, 2009.

(51) Int. Cl.
*B01D 53/02* (2006.01)
(52) U.S. Cl.
USPC ............... 95/117; 95/115; 96/122; 96/126; 62/94; 62/480; 202/182; 202/183; 202/185.1; 203/10; 203/11; 203/12; 203/41
(58) Field of Classification Search
USPC ........... 62/94, 480; 95/115, 117; 96/122, 126; 202/182, 183, 185.1; 203/10–12, 41
See application file for complete search history.

(56) References Cited

U.S. PATENT DOCUMENTS

| | | | | |
|---|---|---|---|---|
| 3,625,886 A | * | 12/1971 | Mattia | 210/673 |
| 3,755,088 A | * | 8/1973 | Osdor | 202/173 |
| 4,495,161 A | * | 1/1985 | Cameron et al. | 423/157.4 |
| 4,664,752 A | * | 5/1987 | Zievers et al. | 203/10 |
| 5,619,866 A | * | 4/1997 | Sato et al. | 62/480 |

(Continued)

FOREIGN PATENT DOCUMENTS

WO WO 2006/121414 A1 11/2006

OTHER PUBLICATIONS

International Search Report and Written Opinion dated Oct. 26, 2010 in connection with corresponding International Patent Application No. PCT/IB2010/001757.

*Primary Examiner* — Christopher P Jones
(74) *Attorney, Agent, or Firm* — Ostrolenk Faber LLP

(57) ABSTRACT

A water desalination system including at least one pair of evaporators, said pair including a high pressure and a low pressure evaporator, each for evaporating saline water to produce water vapor; at least three adsorption beds in selective vapor communication with each evaporator, said adsorption beds arranged to reversibly adsorb the water vapor from the corresponding evaporator; said adsorption beds in selective vapor communication with a condenser, and in heat transfer communication with a heat source for selectively desorbing the adsorbed water vapor; said condenser arranged to condense the water vapor to desalinated water; wherein said system is arranged to sequentially connect, for a pre-determined period, each evaporator to a corresponding adsorption bed, and the heat source to the third bed.

17 Claims, 6 Drawing Sheets

(56) References Cited

U.S. PATENT DOCUMENTS

| | | | |
|---|---|---|---|
| 5,758,509 A * | 6/1998 | Maeda | 62/94 |
| 5,768,904 A * | 6/1998 | Tagamolila et al. | 62/238.3 |
| 6,158,237 A * | 12/2000 | Riffat et al. | 62/484 |
| 6,442,951 B1 * | 9/2002 | Maeda et al. | 62/94 |
| 7,143,589 B2 * | 12/2006 | Smith et al. | 62/94 |
| 2002/0053217 A1 * | 5/2002 | Chua et al. | 62/480 |
| 2005/0044862 A1 * | 3/2005 | Vetrovec et al. | 62/93 |
| 2008/0083231 A1 * | 4/2008 | Wang | 62/93 |
| 2010/0170776 A1 * | 7/2010 | Ehrenberg et al. | 202/168 |
| 2010/0258426 A1 * | 10/2010 | Ng et al. | 203/10 |

* cited by examiner

DESALINATION SYSTEM AND METHOD

CROSS REFERENCE TO RELATED APPLICATIONS

The present application is a 35 U.S.C. §371 National Phase conversion of PCT/IB2010/001757, filed Jul. 20, 2010, which claims the benefit of U.S. Provisional Application No. 61/226,783, filed Jul. 20, 2009, the disclosure of which is incorporated herein by reference. The PCT International Application was published in the English language.

FIELD OF INVENTION

The invention relates to the desalination of saline or brackish water, including systems for the evaporation and adsorption of said water, and means to collect such water.

BACKGROUND

The search for fresh or potable water remains a pressing concern throughout many regions of the world, even though most of the Earth's surface is covered by oceans. The World Health Organization (WHO) reported that about 41% of the Earth's population lives in water-stressed areas and the number of people in the water scarce regions may climb to 3.5 billion by the year 2025. Hence, there is a great motivation to explore a more efficient and environmental-friendly desalination method.

The methods for desalination available hitherto are categorized into two groups, namely, the thermally and the electric power-driven methods. The thermal activated process includes multi-stage flash (MSF) and multi-effect desalination (MED) whereas the second method includes membrane-based reverse osmosis (RO), freezing, mechanical vapor compression and electro-dialysis. The hybrid plants are a combination of the RO and the MSF processes and they can recover higher water yields of water with lesser dissolved solids (<500 mg/l) for human consumption, as stipulated by the World Health Organization (WHO) standards. Ion exchange is another hybrid method whereby ions of dissolved inorganic salts are replaced with the more desirable ions, and such as a process have been used to minimize the fouling and carry-over to the water. The aforesaid types of desalination suffer from three fundamental drawbacks: (i) The high thermal energy consumption as the processes are maintained at higher driving source temperatures, (ii) the high electric energy consumption due to the poor recovery ratios and (iii) the high maintenance cost arising from salt deposition, fouling in the evaporating unit or the frequent replacement of membranes.

STATEMENT OF THE INVENTION

In a first aspect, the invention provides a water desalination system comprising:
at least one pair of evaporators, said pair comprising a high pressure and a low pressure evaporator, each for evaporating saline water to produce water vapour; at least three adsorption beds in selective vapour communication with each evaporator, said adsorption beds arranged to reversibly adsorb the water vapour from the corresponding evaporator; said adsorption beds in selective vapour communication with a condenser, and in heat transfer communication with a heat source for selectively desorbing the adsorbed water vapour; said condenser arranged to condense the water vapour to desalinated water; wherein said system is arranged to sequentially connect, for a pre-determined period, each evaporator to a corresponding adsorption bed, and the heat source to the third bed.

In a second aspect, the invention provides a method for desalinating water, the method comprising the steps of: evaporating saline water in a high pressure and a low pressure evaporator to produce water vapour; directing the water vapour from the high pressure evaporator to a first adsorption bed, and adsorbing water vapour until an adsorption medium within said first bed is saturated; directing the water vapour from the low pressure evaporator to a second adsorption bed and adsorbing the water vapour by an adsorption medium within said second bed;
; heating a saturated adsorption medium within a third adsorption bed to desorb water vapour from said medium; directing the desorbed water vapour to a condenser, and condensing said water vapour to desalinated water.

In a third aspect, the invention provides a cooling system comprising: at least one pair of evaporators, said pair comprising a high pressure and a low pressure evaporator, each for evaporating saline water to produce water vapour during an evaporative cycle; a first and second water circulation system in heat transfer communication with said respective high and low pressure evaporators; wherein following an evaporative cycle, the system is arranged to collect cooled water from the first water circulation system and chilled water from the second water circulation system.

In a fourth aspect, the invention provides a method of cooling comprising the steps of: providing at least one pair of evaporators, said pair comprising a high pressure and a low pressure evaporator; evaporating saline water in each evaporator to produce water vapour during an evaporative cycle; providing a first and second water circulation system in heat transfer communication with said respective high and low pressure evaporators; following an evaporative cycle, collecting cooled water from the first water circulation system and chilled water from the second water circulation system.

An adsorption process refers to the vapor communication or uptake between a bed (containing unsaturated adsorbent) with either the low or the high pressure evaporator; the high pressure evaporator produces a cooling stream at temperatures near to the ambient temperatures, typically from 20 to 30° C. which can be directly for sensible or process cooling. The said low pressure evaporator, on the other hand, generates a stream of coolant at 5 to 10° C. which is useful for air conditioning or dehumidification. Owing to these external thermal loads, the vapor pressures in the evaporators are maintained.

A desorption process refers to the removal of adsorbed water vapor from the adsorbent by the application of heat, supplied from a coolant heat source or any other means. The desorbed vapor is collected in the condenser; said condenser is adapted to condense the water vapor as desalinated water.

In one embodiment, the invention may include an adsorption-desalination cycle comprising three-adsorption bed and two-evaporator assembled to operate as an adsorption device in which a two-temperature level type of cooling (both sensible and dehumidification) is generated at the evaporators whilst concomitantly, fresh or potable water may be produced at the condenser. The embodiment may include arrangements of the high and low-pressure evaporators in thermal and mass communication with the adsorbent beds, operating in tandem and yet in a pre-determined manner with an externally supplied heat source.

In a further embodiment, the system may include an AD cycle which produces cooling and desalination, with a heat source for desorbing an adsorption bed at a low temperature heat input varying from 65 to 75° C. The proposed invention may be directed to two key parameters, namely the specific daily water production (SDWP) and the cooling capacity.

In a further embodiment, chilled water at 4° C. to 10° C. may be produced from the low-pressure evaporator, which may be used for residential air-conditioning while the high-pressure evaporator may produce chilled water at 18° C. to 27° C. which may be utilized for district process cooling, or industrial cooling systems In one embodiment, the water vapour from the evaporators and heat source may be respectively directed to the corresponding adsorption bed for the pre-determined period. This pre-determined period may be a function of the desorption rate of a saturated adsorption bed. Alternatively the pre-determined period may be a function of the rate of saturation of an adsorption bed. Further, the pre-determined period may be the greater of the period to desorb a saturated adsorption bed and the period to saturate unsaturated adsorption bed.

In a preferred embodiment, two heat exchanger chambers may be used for the evaporation of saline, brackish or waste water where the energy for evaporation is extracted from the cool water and chilled water circuits, the said cool and chilled water circuits may be used for dehumidification purposes. External cooling for condensation may be required and the heat of condensation may be recovered for the evaporation process of saline water at the higher pressure evaporator.

According to a further embodiment, each adsorption bed comprises finned-tube heat exchanger with the adsorbent material placed in spaces between finned tubes. Said material may be silica gel, synthetic zeolite, or any other hydrophilic porous adsorbent having a specific surface pore area not less than 500 m$^2$/g.

In a more preferred embodiment, at least one array of adsorbent beds may be arranged vertically within at least one adsorption bed tower, each of said beds may include a mesh adapted to encapsulate the heat exchanger so as to retain the adsorbent material.

According to a further embodiment of the invention, the temperature range within the low pressure evaporator may be in the range 5° C. to 10° C., whereas the temperature of the higher pressure evaporator ranges from 20 to 30° C. In a further embodiment, there may be the use of a cool water re-circulation system to enhance the boiling in the evaporator at relatively high pressure, and the amount of water vapor uptakes in the adsorbent bed, there may also be the use of chill-water re-circulating system.

According to a further aspect of the invention there is provided further consequence of using low and moderate temperature evaporation rather than direct heating of the saline water to produce water vapor is that at these low temperatures, fouling is reduced significantly and thus lowers the maintenance cost of plant operation.

In a preferred embodiment, conventional carbon steel may be used for many of the key components of the proposed AD plant such as the adsorber and desorber beds, as well as the condenser unit due to low fouling rates at sub-atmospheric pressures. Only the evaporator unit may require alloy steel to prevent excessive corrosion.

In a further embodiment, chilled water from the evaporators may be used to cool the designated desorber bed for the first quarter of the cycle and then re-directed to the adsorption beds for the second quarter of the cycle. During these periods, low and high pressure evaporators are connected to the designated adsorption bed. By increasing the evaporator pressure (with the cooler water), the amount of water vapor uptake is further increased for the second quarter of the cycle. The lowering of the adsorbent temperature (when chilled water is channeled into the adsorber towers) may enhance the vapor-uptake by the adsorbent.

In general, the invention may include a process for desalinating water comprising the steps of lower and higher pressure evaporating saline water within two evaporators, alternatively to produce water vapor; adsorbing the water vapor from the evaporator using an adsorption means in the adsorption beds for low and high pressurized (sub-atmospheric) water vapor communications; desorbing the adsorbed water vapor from the adsorption means using desorbing means and delivering the water vapor to a condenser; condensing the water vapor to form desalinated water.

In a further embodiment, the first and second stages of evaporating and adsorbing steps may be performed until saturation of the adsorption means, and the desorbing and condensing steps commenced until a substantial quantity of the adsorbed water vapor has been desorbed from the adsorption means.

In one embodiment, the adsorbing step may be performed until saturation of the adsorbent means. In a further embodiment, the desorbing step may be performed until the adsorbed water vapor is substantially removed from the desorption bed. In a preferred embodiment, the process may switch the adsorbing step and the desorbing step between the adsorption beds, either at saturation or at substantial removal of adsorbed water vapor or when both processes are complete.

According to a third aspect of the invention, there is provided a process for effective and sensible cooling comprising the steps of low and high pressure (sub-atmospheric) evaporation of saline water in the two evaporators to produce water vapor; adsorbing the water vapor from the evaporator using an adsorption means in the adsorption beds for low and high pressurized water vapor communications. Due to the adsorption-triggered-evaporation processes, sensible cooling is at the high pressure evaporator, and the effective cooling occurs at the low pressure evaporator.

In a preferred embodiment, the stainless steel-finned tubes are arranged either horizontally or vertically in two evaporators and one condenser. The said evaporation is achieved by pool boiling process and the energy for evaporation is obtained from the external cooling water circuits. The said condensation is achieved by desorption of desorbed water vapors inside the condenser where the condensation may be either film or drop wise.

In a preferred embodiment of the invention, the evaporator and the condenser are made of anti-corrosive materials such as alloy steel to prevent excessive corrosion. The rest components of the plant such as adsorber and desorber chamber can be made of conventional carbon steel or concrete.

BRIEF DESCRIPTION OF THE DRAWINGS

It will be convenient to further describe the present invention with respect to the accompanying drawings which represent possible arrangements of the invention. Other arrangements of the invention are possible and consequently, the particularity of the accompanying drawings is not to be understood as superseding the generality of the proceeding description of the invention.

DETAILED DESCRIPTION

The invention describes the use of two evaporators and three adsorption beds or reactors in a thermally-driven adsorption cycle. The apparatus are arranged to operate in a manner to give maximum cooling cum desalination effects which are achieved by only one heat input. The heat source is supplied to the adsorption cycle at low-temperatures, typically from 65 to 75° C. The useful effects produced from the efficient adsorption cycle are (i) the generation of desalted water from saline or brackish water, (ii) the production of cooling effects at two temperature levels: One stream of coolant is generated from the AD cycle at 20-30° C. which is applicable to sensible cooling of industrial processes, district cooling applications, etc. The other cooling stream is generated at 5-8° C. which is suited for air conditioning or dehumidification. The unique arrangement of a two-evaporator and three-reactor configuration provides the process opportunity that compliment positively in terms of the operation of adsorption and desorption processes, i.e., the vapor uptake by adsorbent is thermally-pressurized. The simulation results show that the AD cycle is capable of producing (i) the chilled water at 7 to 10° C. with varying cooling capacity range of 3 to 4 Rton per tonne of silica gel, and (ii) the cooling water at 20 to 22° C. with cooling capacity ranging from 5 to 7 Rton per tonne of silica gel. Simultaneously, the rated AD cycle produces a specific daily water production (SDWP) of 12.3 $m^3$ per tonne of silica gel per day.

Figure 1:
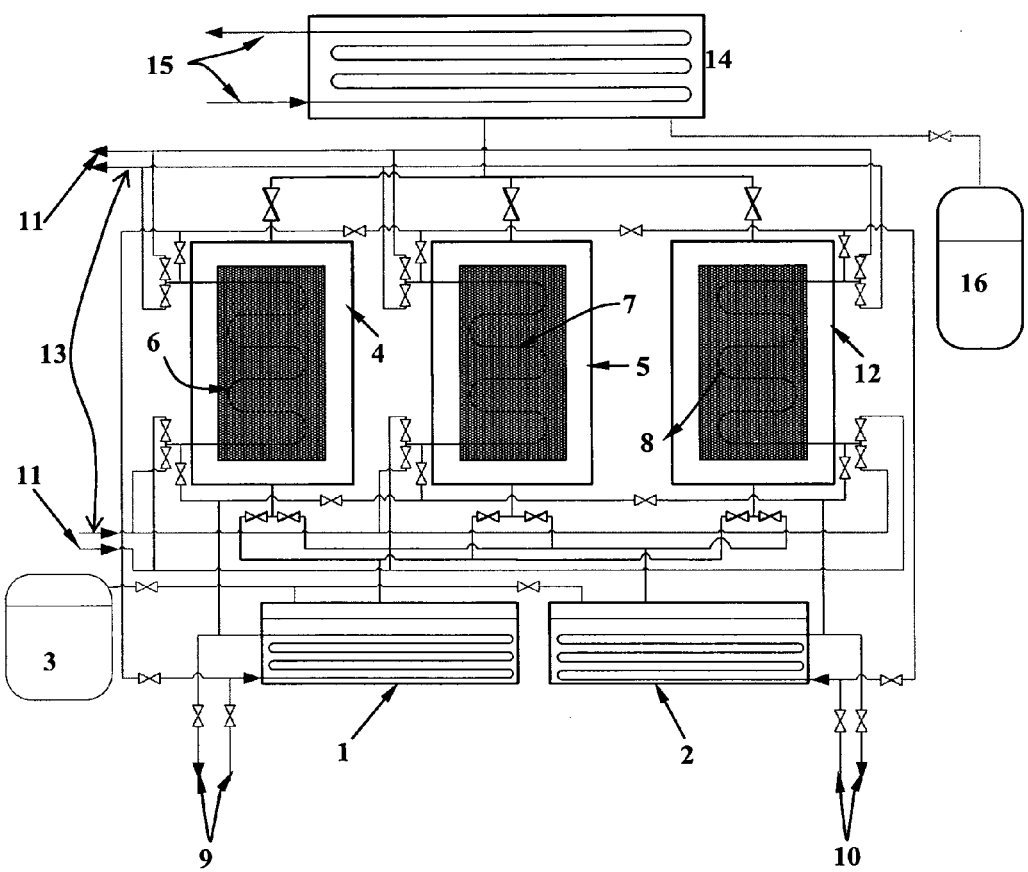
FIG. 1 is a schematic diagram of desalination system and process according to one embodiment of the present invention.

FIG. 1 shows the schematic view of the adsorption cooling cum desalination system consisting of two evaporators, condenser and three reactor beds containing adsorbent materials according to the present invention. According to the present invention, the process involves two evaporators 1 and 2 having a supply of saline water 3 subjected to a relatively low temperature environment for instance in the range 5° C. to 40° C. Water vapor is adsorbed on the adsorbent beds 4 and 5. The adsorbent beds adsorb the water vapor using an adsorbent material, for instance, a silica gel having a specific pore surface area greater than 500 $m^2/g$. To enhance the adsorption, the adsorbent beds include heat exchangers 6, 7 and 8, subject to the circulation of a coolant.

The adsorption cooling cum desalination process according to the present invention is fundamentally a batch process that comprises three stages. The first stage being the adsorption phase, involves the water vapor being evaporated from the high and low pressure evaporators 1 and 2 due to the cooling water circuit 9 and chilled water circuit 10, the evaporated water vapor is directed to the adsorbent beds 4 and 5 for a predetermined time. The predetermined time may be a function of the saturation capacity of the adsorbent material or, alternatively, subject to the most effective or efficient process either economically or production-wise. During adsorption process, solenoid the water valves are opened to allow the flow of the cooling water 11 through the adsorber tubes 6 and 7 of two beds 4 and 5. The adsorption process continues until the adsorbent materials inside the adsorber bed are fully saturated with vapors. The delivery of water vapor is disconnected from the adsorber bed 12 by the supply of hot water 13 through the adsorber tube 8, and a conduit to the condenser 14 is opened. In order to achieve equilibrium, the saturation point of the adsorbent material will be such that water vapor is then directed to the condenser. A supply of cool water 15 is provided to the condenser 14 to condensate the water vapor, and the condensed water is collected in the tank 16 as fresh water.

On the commencement of the second stage, the desorber bed 12 changes from the desorption mode to adsorption mode by cooling water supply 11 to the bed 12 through the tube 8, and the high pressure adsorber bed 4 in the previous stage is transformed into desorption mode by the supply of hot water 13 to the bed 4 through tube 6. The low pressure bed 5 in the previous cycle is conned to the high pressure evaporator such that the adsorbents in the bed 5 can adsorb more water vapor and produce sensible cooling at evaporator 1. During this stage, the bed 4 is connected to the condenser for producing water, and the valve between the low pressure evaporator 2 and the bed 12 is opened for generating effective cooling for air conditioning.

On the commencement of the third stage, being the desorbing phase, the supply of water vapor 13 is connected to the adsorbent bed 5 and a conduit to the condenser 14 is opened. In order to achieve equilibrium, the saturation point of the adsorbent material will be such that water vapor is then directed to the condenser. The condenser 14 captures and condenses the desorbed water vapor, and subsequently directs this to a water storage tank 16 containing the desalinated water. During this stage, the desorber bed 12 is conned to the high pressure evaporator such that the adsorbents in the bed 12 can adsorb more water vapor and produce sensible cooling at evaporating pressure 1. The desorber bed 4 of the previous stage changes from desorption mode to adsorption mode by cooling water supply 11 to the bed 4 through the tube 6.

Whilst not essential to the invention, the process according to the present invention is made more efficient, and so increases water production, sensible cooling and effective cooling capacities, through cooling the adsorbent beds during the adsorption phase and heating of the adsorbent bed during the desorbing phase. To maintain the desired temperature within adsorbent beds during each of the phases, the heating and cooling supply may further include a re-circulation system whereby the coolant/heating supply may be maintained at the appropriate temperature.

Describing in more detail the cooling and hot water supplies, the cooling water is circulated from a cooling tower (not shown), whereby the collected heat from the adsorption phase is dissipated to the environment. The re-cooled water is then returned to the common cooling water line 11 for distribution to the appropriate reaction bed tower in the adsorbent material. It should be noted that, for a range of purpose, it may be preferable to only re-circulate a portion of the cooling water. The non-circulated water may be dumped, used for a different system.

Figure 2:
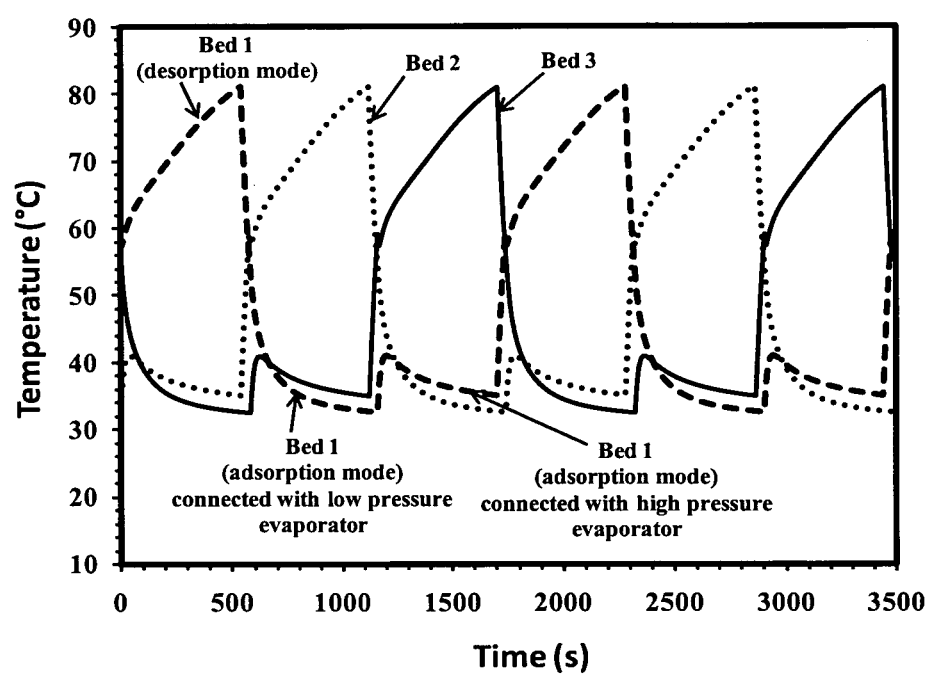
FIG. 2 is a simulated temperature-time histories of the adsorber and desorber beds according to one embodiment of the present invention.

FIG. 2 shows the simulated temperature-time histories of the adsorber and desorber beds 4, 5, 12 of the embodiment of the present invention. The simulation of the AD cycle is done by using FORTAN IMSL library function. A set of modeling differential equations are solved by using Gear's BDF method. The parameters used in the simulation are listed in the following table. From the simulation, it is found that the desorption is occurred at the temperatures ranging from 60 to 80° C. The low and high pressure bed temperatures vary from 33 to 40° C.

Figure 3:
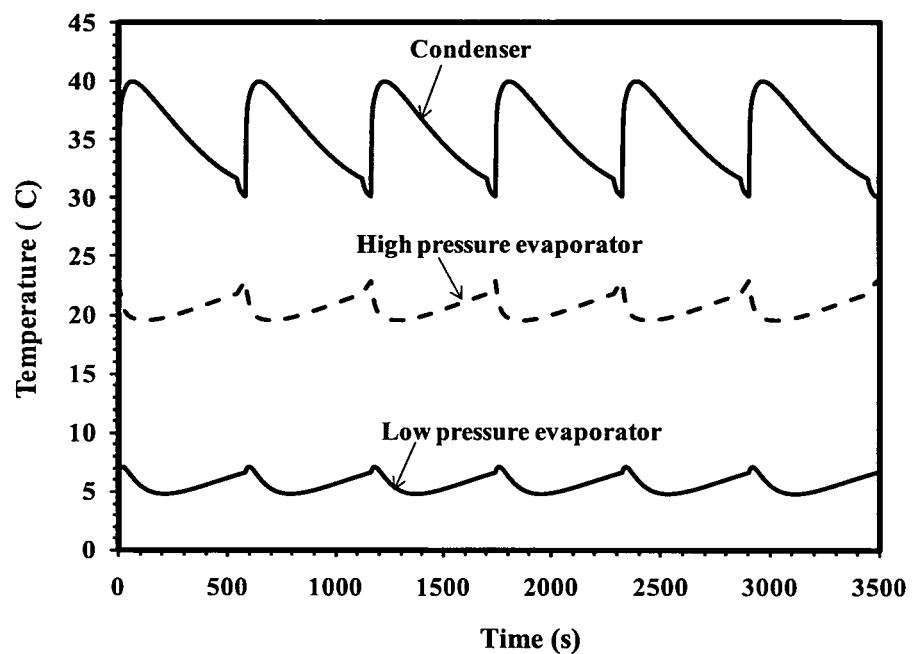
FIG. 3 is a simulated temperature-time histories of the condenser, the low pressure and the high pressure evaporators according to one embodiment of the present invention.

FIG. 3 shows the temperature-time histories of the condenser, the low pressure and the high pressure evaporators (1 and 2) of the embodiment of the present invention. It is observed from the present simulation that the temperature of the low pressure evaporator 1 ranges from 5 to 7° C., which is very prominent for air conditioning applications. The high pressure evaporator 2 temperature varies from 20 to 22° C., which is good for sensible cooling. The feature of the present invention is that it decreases the peak evaporation temperature as opposed to the conventional adsorption chiller.

Figure 4:
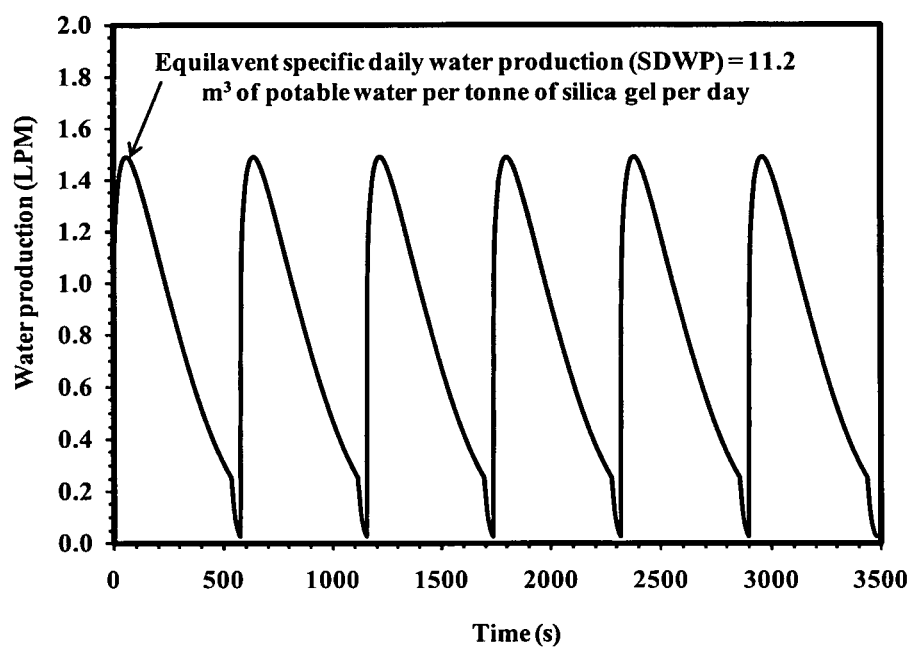
FIG. 4 is a predicted production rate of fresh water according to one embodiment of the present invention.

FIG. 4 is the predicted production rate of fresh water of the present invention. The amount of fresh water production rate in terms of specific daily water production (SDWP) is shown in FIG. 4 and the predicted SDWP is 12.2 $m^3$ of fresh water per tonne of silica gel per day.

Figure 5:
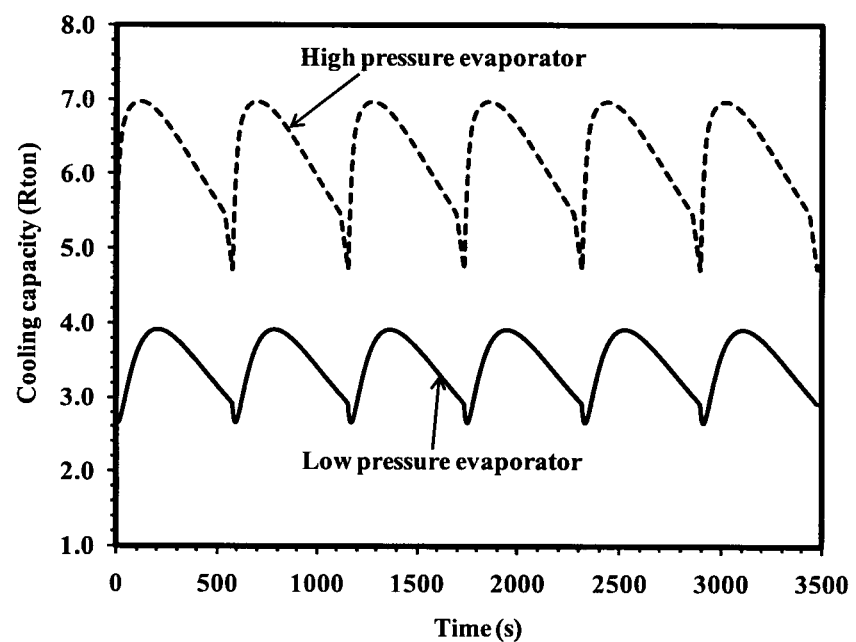
FIG. 5 is an effective and sensible cooling capacities according to one embodiment of the present invention.

FIG. 5 shows the effective and sensible cooling capacities as a function of operating time according to one embodiment of the present invention. The cycle average sensible cooling capacity is 6 Rton and effective cooling capacity is 3.5 Rton.

Figure 6:
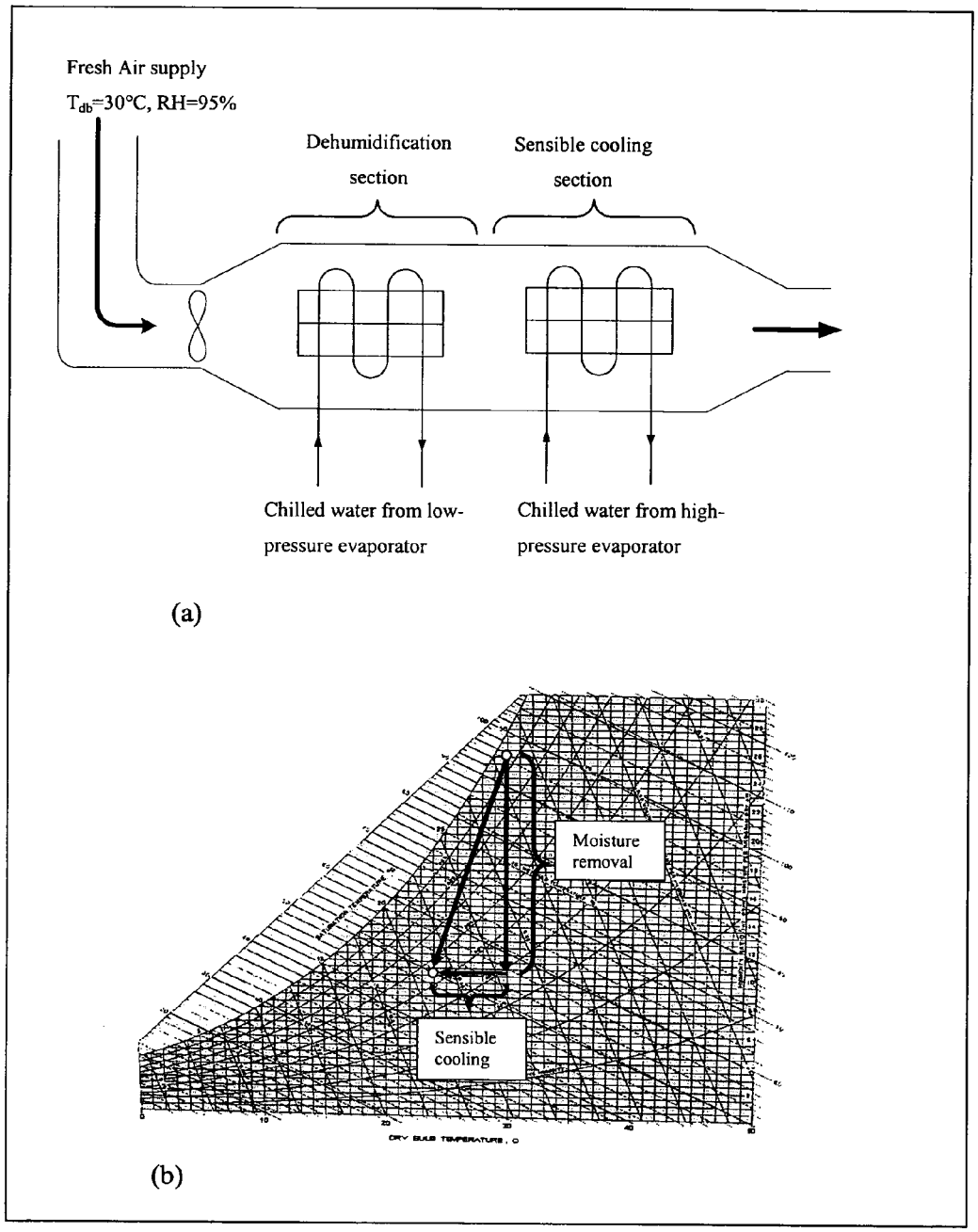
FIG. 6(a) is a schematic view of a further embodiment of a double-stage Air Handling Unit (AHU).
FIG. 6(b) is a graphical representation of the effect of the double-stage AHU of FIG. 6(a) using a Psychometric Chart.

FIG. 6(a) shows the application of the three-bed, two-evaporator adsorption cycle in a double-stage AHU. In this proposed invention, the delivered chilled water from the low pressure evaporator removes the moisture (latent heat) from the fresh air supply. The treated air is then directly cooled (sensible) by the outlet coolant from the high pressure evaporator.

Finally, the explanation regarding the application of the present invention in double-stage AHU using the Psychometric Chart is provided in FIG. 6(b). In this innovative arrangement the energy required to reheat the sub-cooled air can be eliminated as opposed to conventional AHU.

An adsorption cooling cum desalination device comprising: Odd number (e.g., three, five, etc.) of adsorption beds, two evaporators and one condenser, which enhances the difference between the amount of water vapor uptakes and off-takes, the rate of evaporation and the amount of condensate water of the AD cycle.

In a further embodiment, adsorption means include at least one array of adsorbent beds each bed comprising of a quantity of adsorbent material.

In a further embodiment, the adsorbent material is packed using heat exchanging tubes with fins and the adsorbent materials are placed in interstitial spaces between the said finned tubes.

In a further embodiment, the adsorption process is maintained by the cooling water or air circuit or both can be used.

In a further embodiment, the coolant passes through the tubes of the said beds and the heat of adsorption removed by rejection means said cooling tower.

In a further embodiment, the desorbing means includes a heating means proximate to the array of beds for heating each bed to aid in the desorption of the adsorbed water vapor.

In a further embodiment, said heating means comprises heating water circulation system for circulating hot water to the heat exchangers of adsorption bed; the hot water is sourced from a hot water tank.

In a further embodiment, the hot water circulation system re-circulates the hot water from the heat exchangers back to the hot water tank. The hot water tank is supplied energy from any one or a combination of waste heat, renewable energy source, hot air from microturbine, microwave, electricity or other heating media.

In a further embodiment, the rejection heat is re-covered by re-directed to the heat source.

In a further embodiment, the condenser chamber is connected to the desorber bed and the desorption process undergoes till the water vapors are fully regenerated and rejected from the adsorbents.

In a further embodiment, the evaporation means includes all evaporation methods including pool boiling, film boiling or spraying inside or outside of the heat exchanger tubes.

In a further embodiment, the condensation includes all means of condensation methods including film and drop-wise condensation inside or outside of the condenser finned tubes.

In a further embodiment, the condensation heat is rejected by the external heat sink such as cooling water or cooling air.

In a further embodiment, the chill water may use for the condensation of water vapor. The condensation includes the enhancements such as finned-tubes or making the surface rough.

In a further embodiment, the fresh condensate collection includes using pumps or u-tube with specific height to balance the pressure difference.

The invention claimed is:

1. A water desalination system comprising:
   at least one pair of evaporators, said pair comprising a high pressure and a low pressure evaporator, each for evaporating saline water to produce water vapour;
   wherein the high pressure evaporator is configured to operate at a higher pressure than the low pressure evaporator;
   at least three adsorption beds in selective vapour communication with each evaporator, said adsorption beds arranged to reversibly adsorb the water vapour from the corresponding evaporator;
   said adsorption beds in selective vapour communication with a condenser, and in heat transfer communication with a heat source for selectively desorbing the adsorbed water vapour;
   said condenser arranged to condense the water vapour to desalinated water;
   wherein said system is arranged to sequentially connect, for a pre-determined period, each evaporator to a corresponding adsorption bed, and the heat source to the third bed.

2. The water desalination system according to claim 1, wherein the predetermined period is a function of the desorption rate of a saturated adsorption bed.

3. The water desalination system according to claim 1, wherein the predetermined period is a function of the rate of saturation of an adsorption bed.

4. The water desalination system according to claim 1, wherein the predetermined period is the greater of the period to desorb a saturated adsorption bed and the period to saturate un unsaturated adsorption bed.

5. The water desalination system according to claim 1, further including a water circulation system in heat transfer communication with at least one evaporator.

6. The water desalination system according to claim 5, wherein water received from the water circulation system being directable to an external application including: residential or commercial air conditioning or industrial cooling system.

7. A method for desalinating water, the method comprising the steps of:
   evaporating saline water in a high pressure and a low pressure evaporator to produce water vapour, wherein the high pressure evaporator operates at a higher pressure than the low pressure evaporator;

directing the water vapour from the high pressure evaporator to a first adsorption bed, and adsorbing water vapour until an adsorption medium within said first bed is saturated;

directing the water vapour from the low pressure evaporator to a second adsorption bed and adsorbing the water vapour by an adsorption medium within said second bed;

heating a saturated adsorption medium within a third adsorption bed to desorb water vapour from said medium;

directing the desorbed water vapour to a condenser, and condensing said water vapour to desalinated water.

8. The method according to claim 7, further including the steps of:

redirecting the water vapour from the high pressure evaporator to the second adsorption bed until the adsorption medium within said bed is saturated;

redirecting the water vapour from the low pressure evaporator to the third adsorption bed;

heating the adsorption medium within the first adsorption bed to desorb water vapour from said medium;

directing the desorbed water vapour to the condenser, and condensing said water vapour to desalinated water.

9. A cooling system comprising:

at least one pair of evaporators, said pair comprising a high pressure and a low pressure evaporator, each for evaporating saline water to produce water vapour during an evaporative cycle;

wherein the high pressure evaporator is configured to operate at a higher pressure than the low pressure evaporator;

a first and second water circulation system in heat transfer communication with said respective high and low pressure evaporators;

wherein following an evaporative cycle, the system is arranged to collect cooled water from the first water circulation system and chilled water from the second water circulation system.

10. The system according to claim 9, further including an air handling unit, such that the first water circulating system further includes a heat transfer portion for projecting a pipe section encapsulating a flow of the cooled water into an air current within said air handling unit.

11. The system according to claim 9, further including an air handling unit, such that the second water circulating system further includes a heat transfer portion for projecting a pipe section encapsulating a flow of the chilled water into an air current within said air handling unit.

12. The system according to claim 9 wherein the cooled water is in the temperature range 18° C. to 27° C.

13. The system according to claim 9 wherein the chilled water is in the temperature range 4° C. to 10° C.

14. The system according to claim 9, further including:

at least three adsorption beds in selective vapour communication with each evaporator, said adsorption beds arranged to reversibly adsorb the water vapour from the corresponding evaporator;

said adsorption beds in selective vapour communication with a condenser, and in heat transfer communication with a heat source for selectively desorbing the adsorbed water vapour;

said condenser arranged to condense the water vapour to desalinated water;

wherein said system is arranged to sequentially connect, for a pre-determined period, each evaporator to a corresponding adsorption bed, and the heat source to the third bed.

15. A method of cooling comprising the steps of:

providing at least one pair of evaporators, said pair comprising a high pressure and a low pressure evaporator, wherein the high pressure evaporator operates at a higher pressure than the low pressure evaporator;

evaporating saline water in each evaporator to produce water vapour during an evaporative cycle;

providing a first and second water circulation system in heat transfer communication with said respective high and low pressure evaporators;

following an evaporative cycle, collecting cooled water from the first water circulation system and chilled water from the second water circulation system.

16. The method according to claim 15, further including the steps of:

introducing the first water circulation system into an air stream of an air handling unit, and;

cooling and dehumidifying said air stream as a result of heat transfer between the cooled water and the air stream.

17. The method according to claim 15, further including the steps of:

introducing the second water circulation system into an air stream of an air handling unit, and;

chilling said air stream as a result of heat transfer between the cooled water and the air stream.

* * * * *